Patented July 7, 1942

UNITED STATES PATENT OFFICE 2,289,036

PREPARATION OF BENZOIC ACID

Wilbur George Parks, Kingston, R. I., and Ralph W. Yula, Fords, N. J., assignors to Hercules Powder Company, Wilmington, Del., a corporation of Delaware No Drawing. Application February 27, 1941, Serial No. 380,898

5 Claims. (Cl. 260—524)

This invention relates to a process for the preparation of benzoic acid, and more particularly it relates to a process for the preparation of benzoic acid by the catalytic oxidation of toluene.

It has long been known that small amounts of benzoic acid are obtained when toluene is oxidized. There have been numerous proposals to prepare benzoic acid by the oxidation of toluene by air with the aid of various catalysts. However, the various methods proposed have had little or no practical value because the benzoic acid produced has been in very small yield and has been in admixture with relatively large proportions of other materials, for example, benzaldehyde. Some of the methods proposed yield fairly appreciable amounts of acid, but the acid is found upon analysis to contain very large and even major proportions of maleic acid. Thus, toluene oxidation processes which avoid the formation chiefly of benzaldehyde have yielded acid mixtures in which any benzoic acid produced was mixed with large proportions of maleic acid, in most cases with the maleic acid predominating. The maleic acid is not only undesirable in reducing the yield of benzoic acid, but renders the recovery of the benzoic acid difficult.

Maleic acid (or anhydride) appears to be the natural predominant oxidation product obtained by heating toluene vapor and air in the presence of the various metal oxide catalysts. Attempts to limit the degree of oxidation tend to cut down greatly the quantity of material oxidized and tend to limit the oxidation to the formation of benzaldehyde which appears to represent a second natural oxidation product. Thus, limited oxidation has also led to very low yields of benzoic acid.

It is an object of this invention to prepare benzoic acid from toluene in improved yield. It is a further object to prepare benzoic acid from toluene with a minimum formation of maleic acid. Other objects will appear hereinafter.

It has been found that these objects can be attained by careful control and coordination of a number of factors. It has been found that if a very large excess of oxygen within certain limits is used to oxidize toluene, a condition normally expected to cause oxidation to maleic acid, and if a vanadium oxide catalyst is used and the temperature and time of contact with the catalyst are held within certain limits, the objects mentioned may be attained.

Thus, in accordance with this invention, a mixture of air and toluene vapor in which the weight ratio of air to toluene is in the range between about 39:1 and about 49:1 is reacted at a temperature in the range between about 410° C. and about 430° C. in contact with a vanadium oxide catalyst for a period of time between about 0.25 and about 0.75 second. This reaction may be brought about by bringing the mixture of air and toluene vapor into contact with a porous bed of inert carrier bearing vanadium oxide catalyst at a temperature in the range specified and maintaining contact between the toluene-air mixture and the catalyst bed for a period of time in the range specified by controlling the velocity of the mixture. The resulting product gas mixture emerging from the catalyst bed is then cooled, and the benzoic acid is recovered therefrom.

In the method according to this invention a mixture of air and toluene in which the weight ratio of air to toluene lies between about 39 and about 49 is first prepared. Preferably, dry air is utilized. However, air having a moisture content of the order of that found in ordinary atmosphere is suitable. The mixture of air and toluene may be prepared simply by mixing air and vaporized toluene in the desired proportion. It may also be prepared by passing air through liquid toluene at a temperature and rate of flow such that a known mixture results by saturation or partial saturation of the air (primary air) by the toluene, and adding secondary air if necessary to reduce the toluene content of the mixture to the desired value. For example, primary air may be substantially saturated with toluene at room temperature, say at 21° C., and then mixed with a volume of secondary air from about 2.6 to about 3.6 times the volume of the primary air to give the desired mixture.

The catalyst which is utilized in the method according to this invention is essentially vanadium oxide. Small amounts of promotor metals such as metals of groups I, II, and III of the periodic table may be present in the form of the oxide or in the form of vanadium compounds, if desired. The catalyst will usually be supported on an inert catalyst support or carrier of a granular, tabular, or other porous nature. Supporting materials such as, for example, Alundum, aluxite, activated alumina, silica gel, granular aluminum, and the like are suitable. Aluminum oxide has been found particularly suitable as a carrier for vanadium oxide in the production of benzoic acid in good yield by the method according to this invention. The catalyst may be conveniently prepared by coating or impregnating a catalyst carrier by a solution of a vanadium compound, such as a vanadium salt or an organic or inorganic vanadate, capable of decomposition or reaction to form vanadium oxide. Compounds of pentavalent vanadium will preferably be used. The vanadium compound on the carrier is then decomposed, hydrolyzed, or otherwise reacted to precipitate vanadium oxide. The catalyst may be heated in a current of air or steam or both to dry out the mix and to drive off volatile components. For example, a carrier such as granular or tableted aluminum oxide may be coated with a paste of ammonium meta-vanadate and water, after which the coated carrier is dried and the ammonium meta-vanadate is decomposed by heating at an elevated temperature such as 250 to 400° C. for a period of time such as 2 to 12 hours in a current of air. Preferably, the decomposition or similar reaction by which the vanadium oxide is prepared is carried out in the reaction chamber in which the catalyst is to be used.

In carrying out the method in accordance with this invention, the temperature within the catalyst bed is held in the range between about 410° C. and about 430° C. Preferably, the catalyst chamber will be jacketed and the jacket provided with a heat-exchanging medium such as, for example, a fusible salt. Temperature control by vaporization of a cooling medium, for example vaporizing mercury, may also be employed.

The time of contact of the toluene-air mixture with the catalyst is considered to be the time required for the said mixture to flow through the catalyst bed utilized. The time of contact will be held within the range between about 0.25 and about 0.75 second. Time of contact is readily regulated for any given depth of catalyst bed by adjusting the velocity of the gas mixture to be reacted. The required velocity or rate of flow in cubic centimeters per second for any given set-up of reaction equipment may be found by dividing the volume of the voids in the catalyst bed (in cubic centimeters) by the desired contact time in seconds, the said contact time being held within the range mentioned.

Coordination of the factors of air-to-toluene ratio, temperature of reaction, and contact time with the particular catalyst utilized results in a yield of benzoic acid sufficiently high to render the process practicable. Relatively small proportions of maleic acid, by which is meant herein maleic acid, maleic anhydride, or both, accompany the benzoic acid in spite of the high air ratio utilized.

The benzoic acid may be recovered from the reaction gases by cooling the gases and condensing reaction products. The benzoic acid may then be purified by fractional crystallization from a solution of the condensed products in an organic solvent such as toluene. A preferred method of recovering benzoic acid comprises cooling the hot reaction gases and passing them through scrubbers in which they are brought into intimate contact with toluene as the scrubbing fluid. The benzoic acid dissolves completely in the toluene. Maleic acid present will be found in the crystalline form suspended in the toluene solution from which it may readily be strained. The benzoic acid itself may then be readily recovered in substantially pure form by evaporating down the toluene scrubbing solution and permitting the benzoic acid to crystallize. Impurities such as benzaldehyde, hydroquinone, and the like which may be present in small quantities remain in the mother liquor of the crystallization step. In this manner substantially pure benzoic acid may be expediently recovered, the success of the procedure being due to the relatively high predominance of the benzoic acid in the oxidation reaction product.

The method in accordance with this invention will be illustrated by specific examples thereof which follow.

*Example I*

A suitable catalyst mass was prepared by mixing 29.8 grams of 8–14 mesh Alfrax (aluminum oxide) and 7 grams of ammonium meta-vanadate with enough water to make a wet paste. The mixture was dried over a steam bath with constant stirring. When dry, the mixture was heated in air at 250° C. until no more ammonia was given off. The catalyst mass was then made into a wet paste with water, dried over a steam bath, and finally dried for 5 hours at 130° C. The resulting catalyst mass was then weighed, and from the weight it was found to carry 10% of vanadium pentoxide. The vanadium pentoxide content of the mass was then reduced to 6.2% by shaking off the excess. The resulting catalyst mass contained about 50% voids or free space.

Thirty cubic centimeters of this catalyst mass were placed in a calorized iron tube having an internal diameter of 0.622 inch, the iron tube being placed vertically inside a jacket containing a salt bath consisting of 55% of potassium nitrate and 45% of sodium nitrate. The bath jacket was surrounded by an electrical heating jacket to maintain it at the desired temperature.

The salt bath was heated and its temperature was maintained at 415–416° C. A mixture of air and toluene vapor in the ratio of 39.8 parts of air per part of toluene by weight was passed into the top of the catalyst tube while maintaining the salt bath at the temperature mentioned, and the toluene-air mixture was passed through the catalyst bed. The rate of air flow in this procedure was 25.4 cubic centimeters per second measured at 25° C., which corresponds to a contact time of 0.25 second with the catalyst bed. The reaction was continuous with the catalyst bed temperature held at 429–430° C.

The gaseous reaction products were passed through a cooling chamber and then passed through a series of scrubbers containing toluene. The toluene dissolved the benzoic acid produced and any benzaldehyde formed. Maleic acid formed in the reaction was found in the scrubbers in the form of crystals insoluble in toluene. The toluene scrubbing solution was removed from insoluble crystals and evaporated for the recovery of benzoic acid which was produced by crystallization from the toluene in substantially pure form. In this manner 24.6% of the toluene oxidized in the reaction was oxidized to benzoic acid, and 4.2% on the same basis was oidized to maleic acid. The remainder of the toluene was unchanged in part, and in part oxidized to carbon dioxide and water and to minor proportions of other oxygenated compounds.

The essential data giving the conditions of operation and the yields obtained for Example I are included in the table which follows. This table also includes similar data for Examples II, III, IV, V, and VI. The manipulative detail for Examples II–VI inclusive was the same as that presented in Example I.

| Example No.— | Weight ratio air to toluene | Air flow cc. per second | Catalyst temp., °C. | Bath temp., °C. | Contact time, sec. | Yield* benzoic acid | Yield* maleic acid |
|---|---|---|---|---|---|---|---|
| I | 39.8 | 25.4 | 429–430 | 415–416 | 0.25 | 24.6 | 4.2 |
| II | 47.4 | 25.4 | 415–417 | 405–407 | 0.25 | 21.5 | 3.2 |
| III | 40.0 | 12.7 | 420–425 | 412–415 | 0.50 | 33.0 | 7 |
| IV | 39.6 | 25.4 | 417–420 | 406–408 | 0.25 | 18.3 | 4.1 |
| V | 45.0 | 12.7 | 428–431 | 415 | 0.50 | 34.0 | 8.4 |
| VI | 39.3 | 8.5 | 412–418 | 402–406 | 0.75 | 32.0 | 11.0 |

*Yields are in percent by weight of the toluene consumed in the reaction.

By the method in accordance with this invention, a relatively very low quantity of maleic acid is formed in association with the benzoic acid. For example, in Example I only 4.2% of maleic acid based on the toluene reacted was formed. Similarly in Example II, only 3.2% based on the toluene reacted was formed. Thus, as little as about one part of maleic acid for each six parts of benzoic acid was formed. In Example IV in the same manner, 4.1% maleic acid based on the toluene reacted was produced.

It will be understood that the details and examples hereinbefore set forth are illustrative only and that the invention as broadly described and claimed is in no way limited thereby.

What we claim and desire to protect by Letters Patent is:

1. A method for the preparation of benzoic acid which comprises reacting a mixture of air and toluene vapor in which the weight ratio of air to toluene is in the range between about 39:1 and about 49:1 at a temperature in the range between about 410° C. and about 430° C. for a period of time in the range between about 0.25 second and about 0.75 second in contact with a vanadium oxide catalyst.

2. A method for the preparation of benzoic acid which comprises bringing a mixture of air and toluene vapor in which the weight ratio of air to toluene is in the range between about 39:1 and about 49:1 into contact with a vanadium oxide catalyst at a temperature in the range between about 410° C. and about 430° C., maintaining said contact for a period of time in the range between about 0.25 second and about 0.75 second, removing the resulting gas mixture from the catalyst, and recovering benzoic acid therefrom.

3. A method for the preparation of benzoic acid which comprises passing a mixture of air and toluene vapor in which the weight ratio of air to toluene is in the range between about 39:1 and about 49:1 through a bed of supported vanadium oxide catalyst at a temperature between about 410° C. and about 430° C. at a rate of flow limiting the time of contact of the said mixture with the catalyst to the range between about 0.25 second and about 0.75 second, cooling the resulting reaction gas mixture, and recovering benzoic acid therefrom.

4. A method for the preparation of benzoic acid which comprises passing a mixture of air and toluene vapor in which the weight ratio of air to toluene is in the range between about 39:1 and about 49:1 through a bed of vanadium oxide catalyst supported on aluminum oxide as a catalyst carrier at a temperature between about 410° C. and about 430° C. at a rate of flow limiting the time of contact of the said mixture with the catalyst to the range between about 0.25 second and about 0.75 second, cooling the resulting reaction gas mixture, and recovering benzoic acid therefrom.

5. A method for the preparation of benzoic acid which comprises passing a mixture of air and toluene vapor in which the weight ratio of air to toluene is about 40:1 through a bed of vanadium oxide supported upon granular aluminum oxide at a temperature of about 429° C. at a rate of flow setting the time of contact of the gas mixture with the catalyst bed at about 0.25 second, cooling the resulting reaction gas mixture, and recovering benzoic acid therefrom.

W. GEORGE PARKS.
RALPH W. YULA.